United States Patent
Wienzek et al.

(10) Patent No.: US 12,347,586 B2
(45) Date of Patent: Jul. 1, 2025

(54) METHOD FOR JACKETING STRANDLIKE ELEMENTS

(71) Applicant: TESA SE, Norderstedt (DE)

(72) Inventors: Tristan Wienzek, Barsbüttel (DE); Lars Macketanz, Hamburg (DE); Lars Guldbrandsen, Barsbüttel (DE); Jan-Gerd Pennekamp, Hamburg (DE); Thomas Gerdsmann, Hamburg (DE); Gerhard Richter, Norderstedt (DE)

(73) Assignee: TESA SE, Norderstedt (DE)

( * ) Notice: Subject to any disclaimer, the term of this patent is extended or adjusted under 35 U.S.C. 154(b) by 195 days.

(21) Appl. No.: 18/066,440

(22) Filed: Dec. 15, 2022

(65) Prior Publication Data

US 2023/0274859 A1 Aug. 31, 2023

(30) Foreign Application Priority Data

Dec. 16, 2021 (DE) .......................... 102021133426.8

(51) Int. Cl.
*H01B 13/02* (2006.01)

(52) U.S. Cl.
CPC ..... *H01B 13/0292* (2013.01); *H01B 13/0207* (2013.01); *H01B 13/0271* (2013.01)

(58) Field of Classification Search
CPC ............ H01B 13/0292; H01B 13/0207; H01B 13/0271; H01B 13/02; H01B 13/01281; B29C 2035/0827; B29C 35/0888; C09J 7/20; C09J 2203/302; C09J 2301/302; C09J 2301/416
See application file for complete search history.

(56) References Cited

U.S. PATENT DOCUMENTS

| | | | | |
|---|---|---|---|---|
| 2010/0084574 A1* | 4/2010 | Brassell | ................... | B05D 7/20 250/492.1 |
| 2020/0255699 A1* | 8/2020 | Klingeberg | ........... | D06M 15/55 |

FOREIGN PATENT DOCUMENTS

| | | |
|---|---|---|
| EP | 3693433 A1 | 8/2020 |
| EP | 3763575 A1 | 1/2021 |
| JP | 2011050185 A | 3/2011 |
| JP | 2011113692 A | 6/2011 |
| JP | 2014017985 A * | 1/2014 |

* cited by examiner

*Primary Examiner* — S. Behrooz Ghorishi
(74) *Attorney, Agent, or Firm* — Norris McLaughlin, PA

(57) ABSTRACT

The invention relates to a method for jacketing strandlike elements (10), comprising the method steps of: a) producing or providing a strandlike element (10), b) wrapping the strandlike element (10) with an adhesive tape (12) to give a wrapped strand (14), the adhesive tape (12) comprising as curable adhesive a radiation-curing and/or thermally curing adhesive, c) arranging the wrapped strand (14) in one or more holding elements (16) of a holding arrangement (18) to establish a predetermined shape and to give a shaped strand (20), and d) curing the curable adhesive in the shaped strand (20) by irradiating the adhesive tape (12) with electromagnetic radiation of a wavelength λ, to give a jacketed strand (22), wherein the one or the two or more holding elements (16) at least in sections are at least partly transmissive for electromagnetic radiation of wavelength λ, wherein the irradiation of the adhesive tape (12) with the electromagnetic radiation of wavelength λ takes place at least partly through the one or the two or more holding elements (16).

18 Claims, 3 Drawing Sheets

METHOD FOR JACKETING STRANDLIKE ELEMENTS

The invention relates to a method for jacketing strandlike elements, more particularly cable strands in the manufacture of cable looms, and also to a holding arrangement suitable for this purpose for establishing a predetermined structure of a shaped strand, and to an associated system. Also disclosed is a strand jacketed by the method.

Modern vehicles nowadays comprise a host of electronic apparatuses which require connection to one another via usually complex cabling. In order to arrange the requisite cables in the interior of the vehicle so as to occupy as little space as possible, and securely, and also, furthermore, to provide protection against mechanical and/or thermal stress or against the unwanted penetration of moisture, it is usual to use what are called cable looms, in which the cables are enclosed by suitable jacketing. In such cable looms, the routed cable strands are jacketed generally by a rigid cable duct, which can be produced, for example, by injection moulding.

The typical operation of producing such jacketed cable looms usually comprises not only the tailoring and assembly of the cables but also an at least provisional connection of the cables, and the arrangement of the resulting cable strand in an injection-moulded duct. From a manufacturing standpoint, the construction of such cable ducts and also the production of the jacketed cable loom is often perceived as being complex and demanding, generally necessitating, in particular, the use of costly and complicated apparatus, for example if the cable duct used for the jacketing is to be produced by injection moulding. The method known from the prior art, as disclosed for example in EP 3763575 A1 or U.S. Pat. No. 6,969,319 A, is usually perceived, correspondingly, not to be time- or cost-efficient; in particular, the cost and complexity of apparatus required can often not be afforded, especially by relatively small-scale operators. Moreover, the comparatively complex production operation usually requires well-trained and experienced personnel in order for manufacturing errors to be reliably avoidable. A particular disadvantage of the method known from the prior art is seen as being that it is usually awkward to adapt for altered macrostructures of the cable loom, i.e. different cable set plans, of the kind which are needed, for example, for two different vehicles, since separately adapted injection moulds are required, for example.

In the case of the method described in EP 3763575 A1, the precise positioning of the cables in the mould is not possible. Owing to the fact that a liquid resin is intended to flow around the cables, the designing of the cable loom in all three dimensions—typically each cable loom has an extent in all three dimensions—is not possible, meaning that only two-dimensional cable looms can be surround-cast in one operation. A further disadvantage is that the curing requires illumination through different thicknesses of resin layers. These accumulations of material require a relatively high energy input.

Furthermore, there are shadow spaces between the cables which are not penetrated by UV light, meaning that in these spaces the resin does not cure, or not completely, and so in the course of time the walls of the cables may be attacked through the uncured resin. All in all a very large amount of resin is required.

One alternative which is highly promising, particularly with a view to the possibility of adaptation to different macrostructures, is the use of adhesive tapes for jacketing cable strands, particularly since the conventional methods frequently employ adhesive tapes anyway to bundle the individual cables. At least in theory, therefore, it appears highly promising to form cable looms by substantially complete wrapping with adhesive tapes. Cable strands wrapped with adhesive tape in this way, however, are generally flexible, and this is seen as a disadvantage in particular with a view to the precise fitting of the cable looms into a vehicle and also the mechanical resistance of the cable looms to mechanical loading, since corresponding flexible cable looms would have to be additionally secured in the vehicle so that they do not slip.

For the solution to this set of problems, it is proposed that a particularly advantageous method for the jacketing of strandlike elements, cable looms for example, can be obtained through the use of adhesive tapes having curable adhesives. This method provides for the strandlike elements for jacketing to be wrapped with an adhesive tape which comprises a reactive adhesive, i.e. an adhesive which can be cured by external influences, for example radiation, thermal energy or chemical reaction with a crosslinker, and whose strength thus attained enables an adhesive bond which is highly durable chemically and physically for a long period, allowing a rigid structure to be given to the jacketed strandlike element. Generally this method is significantly more time- and cost-efficient than the methods known from the prior art that provide, for example, for an injection-moulded cable duct. Moreover, this method makes it possible in an advantageous way, with little cost and complexity of apparatus, to produce high-performance cable looms which, moreover, can be adapted very flexibly to different macrostructures, for example different cable set plans, without the need for extensive alterations to the devices used.

As a result of this approach, not only is the overall operation of producing jacketed cable looms simplified, but it is also usually possible to achieve a volume saving, allowing the required installation space to be reduced if the reactive adhesive tape itself forms the shape-imparting part of the cable loom which is brought into the desired shape prior to curing. This method, moreover, is generally associated with a reduction in the overall weight of the resultant jacketed cable loom, relative to the method known from the prior art.

On the basis of this extremely advantageous regime for the production of jacketed elements, for example cable looms, the inventors have recognized that the major challenge of this method lies, however, in reliable shaping for the shaped strand and in reproducible and reliable curing of the adhesive tapes.

In spite of the disadvantages described above for the conventional method with jacketing produced by injection moulding, for example, that method is at least advantageous in that the strandlike elements can usually be fitted comparatively reliably into the jacketing, and the outer contour of the jacketed cable strand can be precisely defined. Conversely, the shaping of a strandlike element jacketed only with uncured adhesive tape proves in practice to be highly challenging. Indeed, before being cured, the strand jacketed with the as yet uncured adhesive tape has to be brought into the desired shape, with the rigidity of the material for shaping being low. When the macrostructure is stretched out, via the arrangement of the strand in the holding elements of a holding device, there is a risk, for example, of the strandlike element sagging between two carrier elements, which would result in an inadequately shaped jacketed strand.

In the case of those curable adhesives which are to be cured, for example, exclusively by thermal energy, in an oven, for example, this set of problems can be solved at least partly through the use of a large number of holding elements, which are sited at extremely low distances from one another and therefore form a receptacle for the shaped strand through which that strand is routed closely. This attempted solution, however, is associated with great disadvantages for some of the possible curable adhesive tapes, specifically for those adhesive tapes which are to be cured through the use of electro-magnetic radiation.

Corresponding adhesive tapes whose pressure-sensitive adhesives are cured by electromagnetic radiation, for example directly by UV radiation or indirectly by thermal energy introduced into the system by way of IR radiation, are nevertheless highly preferable in terms of the time- and cost-efficiency of processing, the cost and complexity of apparatus required, and the mechanical robustness which can generally be achieved for the resultant jacketing, and consequently the restriction is a serious one in practice.

Any holding element which bears against the strand jacketed with uncured adhesive tape shields a part of the underlying adhesive tape from the electromagnetic radiation that is needed for curing. At the same time, the curing induced by electromagnetic radiation is usually relatively locally confined, and so any migrant reaction of the curing, i.e. a propagation of the curing into the regions masked by the carrier elements, is also usually not enough to achieve sufficient curing throughout the entire jacketed strand. Especially when using a large number of carrier elements and/or using carrier elements which, for the purpose of effective shape adaptation, possess comparatively broad receptacles for the shaped strand, there is generally a risk, therefore, when using radiation-curing adhesives, that insufficient curing will produce weak points in the shaped jacketing. On subsequent use in the vehicle, these weak points may lead to material failure in the jacketing, possibly resulting, in the worst case, in damage to the cabling.

The object of the present invention was to eliminate or at least reduce the above-described disadvantages of the prior art.

The object of the present invention more particularly was to specify a method for the jacketing of strandlike elements, more particularly cable strands, with which a jacketed strand is obtained that possesses a high rigidity and excellent mechanical robustness, with the material exhibiting extremely few weak points that would result from insufficient curing.

Accordingly the object of the present invention was to specify a method which can be employed particularly time- and cost-efficiently and also without great cost and complexity of apparatus, in order to achieve highly performing jacketing of strandlike elements, especially using advantageous adhesives which can be cured by irradiation with electromagnetic radiation.

A supplementary object of the present invention was that the jacketed strands to be produced by the method to be specified should be able to be adjusted particularly precisely to a predetermined macrostructure, with a desire not only that a particularly smooth surface of the jacketing be achieved but also that a particularly dense structure with a close conforming of the jacketing to the jacketed elements should be achieved.

It was, accordingly, a further object of the present invention that complex macrostructures as well, for example cable looms whose cable set plans exhibit a multiplicity of branching points, can be manufactured reliably and precisely by the method to be specified.

In this context it was desirable that with the method to be specified, the complex step of shaping strandlike elements wrapped with non-curable adhesive tape can be simplified in that the step of shaping can be performed reliably and reproducibly even by untrained personnel.

An additional object of the present invention was that of identifying suitable operating parameters and an optimized regime for the method to be specified, allowing particularly strong and mechanically robust jacketing to be produced.

In this connection it was a supplementary object of the present invention to specify a holding device and an associated system with which the corresponding method can be performed particularly efficiently.

The inventors of the present invention have now found that the objects described above can surprisingly be achieved if, starting from the above-described method and employing adhesive tapes with an adhesive which can be cured by irradiating the adhesive tape with electromagnetic radiation, the holding elements of a holding arrangement that are used for arranging the strand wrapped with adhesive tape are formed in such a way that they are transmissive for electromagnetic radiation of the wavelength used, in the manner defined in the claims.

The objects stated above are therefore achieved by the subject matter of the invention as it is defined in the claims. Preferred configurations of the invention are evident from the dependent claims and from the observations below.

Those embodiments which are designated below as being preferred are combined in particularly preferred embodiments with features of other embodiments designated as being preferred. Especially preferred, accordingly, are combinations of two or more of the embodiments identified below as being particularly preferred. Likewise preferred are embodiments in which a feature of one embodiment, designated to some extent as being preferred, is combined with one or more further features of other embodiments that are designated to some extent as being preferred. Features of preferred holding arrangements, systems and shaped strands are apparent from the features of preferred methods.

The invention relates to a method for jacketing strandlike elements, comprising the method steps of:
a) producing or providing a strandlike element,
b) wrapping the strandlike element with an adhesive tape to give a wrapped strand, the adhesive tape comprising as curable adhesive a radiation-curing and/or thermally curing adhesive which is preferably at the same time pressure-sensitively adhesive,
c) arranging the wrapped strand in one or more holding elements of a holding arrangement to establish a predetermined shape and to give a shaped strand, and
d) curing the curable adhesive in the shaped strand by irradiating the adhesive tape with electromagnetic radiation of a wavelength $\lambda$, to give a jacketed strand, wherein the one or the two or more holding elements at least in sections are at least partly transmissive for electromagnetic radiation of wavelength $\lambda$, wherein the irradiation of the adhesive tape with the electromagnetic radiation of wavelength $\lambda$ takes place at least partly through the one or the two or more holding elements.

In the method of the invention, a strandlike element is first produced or provided. A strandlike element of this kind may comprise, for example, hoses or cables, and a bundle of two or more of these component elements may also be used. Strandlike elements may be produced, for example, by the joining of these likewise strandlike component elements. The method of the invention is particularly highly performing in the production of cable looms by jacketing of cable strands. Preference is therefore given to a method of the invention wherein the strandlike element comprises one or more leads and/or cables, with the strandlike element preferably being a cable strand which comprises a multiplicity of cables, a part of a cable loom being obtained by the method by jacketing of the cable strand. Preference is also given to a method of the invention wherein the strandlike element comprises two or more strandlike component elements, preferably leads and/or cables, with the strandlike component elements being preferably joined to one another and/or pre-secured relative to one another before the wrapping of the strandlike element, this being achieved more preferably through the use of clips and/or cable ties and/or adhesive tape, especially preferably through the use of adhesive tape, or more preferably by jacketing produced beforehand by the method.

In agreement with the understanding of a person skilled in the art, the strandlike element may be a constituent of a larger macrostructure, for example a constituent of a larger cable loom, which comprises a multiplicity of constituents joined via joining regions, branching points for example. In this context, the simple jacketing even of complex structures, and the ready possibility of use on sub-regions, may be seen as a great advantage of the method of the invention. In a preferred method of the invention, the strandlike element is part of a macrostructure which comprises a multiplicity of strandlike individual elements extending within the macrostructure, with the macrostructure comprising a multiplicity of strandlike constituents joined to one another via joining regions, with the method being preferably also used for the jacketing of the joining regions, and/or with the macrostructure correlating preferably with the cable profile in a vehicle, more particularly a motor vehicle or an aircraft.

The strandlike element is wrapped with an adhesive tape to give a wrapped strand, in which the strandlike element is surrounded by the as yet uncured adhesive tape. The term "adhesive tape" is clear to the skilled person in the field of adhesive technology. In the context of the present invention, the expression "tape" refers to all thin, sheetlike structures, i.e. structures having a predominant extent in two dimensions, more particularly films, film portions and labels, preferably tapes with extended length and limited width, and also corresponding tape portions.

For the wrapping, the inventors here have a winding technique which results in a particularly robust jacketing, it being especially conducive to wrap the wrapped strand completely with adhesive tape in the regions to be jacketed, more particularly in those regions which in the subsequent use of the jacketed element are exposed to high mechanical loads. Preference is given, against this background, to a method of the invention wherein the adhesive tape during wrapping is placed in helical lines around the strandlike element, with the wrapping taking place preferably such that each subsequent turn of the adhesive tape is applied at least partly, preferably at least to 30% of the area, more preferably at least 40% of the area, especially preferably at least 50% of the area, more particularly preferably not more than 80% of the area, to the preceding turn of the adhesive tape, and/or where the strandlike element at least in sections is wrapped substantially completely with the adhesive tape, so that the surface of the wrapped strand at least in sections is formed substantially completely by the adhesive tape. In an alternative regime, the strandlike element is enveloped in an axial direction by the adhesive tape. The wrapping of a strandlike element with the adhesive tape in this case does not take place—as elucidated above—in the form of a helical line, but instead takes place such that, during the wrapping, a longitudinal axis of the tape is aligned substantially parallel to the direction of extent of the strandlike element. As viewed in cross section, the adhesive tape in this case lies in the form of an Archimedean spiral around the strandlike element. This type of winding is in some cases also referred to as "bandaging of the cable loom".

In order to enable extremely efficient wrapping of the strandlike element with the adhesive tape, the inventors, according to one preferred embodiment of the invention, propose forming the curable adhesive as a pressure-sensitive adhesive, in order thus to achieve easier attachment on the strandlike element. Preferred accordingly is a method of the invention wherein the curable adhesive is a pressure-sensitive adhesive.

A pressure-sensitive adhesive, in agreement with the understanding of a skilled person, is an adhesive which possesses pressure-sensitive adhesive properties, i.e. has the capacity to enter into a durable bond to a substrate even under relatively weak applied pressure. Corresponding pressure-sensitive adhesive tapes are typically redetachable from the substrate substantially without residue after use, and in general have a permanent intrinsic tack even at room temperature, meaning that they have a certain viscosity and touch-tackiness, so that they wet the surface of a substrate even under low applied pressure. The pressure-sensitive adhesiveness of a pressure-sensitive adhesive tape is a product of the use as adhesive of a pressure-sensitive adhesive. Without wishing to be tied to this theory, it is frequently assumed that a pressure-sensitive adhesive may be considered to be a fluid of extremely high viscosity with an elastic component, accordingly having characteristic viscoelastic properties which lead to the above-described durable intrinsic tackiness and pressure-sensitive adhesive capability. It is assumed that with such pressure-sensitive adhesives, on mechanical deformation, there are viscous flow processes and there is development of elastic forces of resilience. The viscous flow component serves to achieve adhesion, while the elastic forces of resilience component is needed in particular for the achievement of cohesion. The relationships between the rheology and the pressure-sensitive adhesiveness are known in the prior art and described for example in Satas, "Handbook of Pressure Sensitive Adhesive Technology", Third Edition, (1999), pages 153 to 203. To characterize the extent of elastic and viscous components, it is usual to employ the storage modulus (G') and the loss modulus (G"), which may be ascertained by dynamic mechanical analysis (DMA), using a rheometer for example, as disclosed in WO 2015/189323, for example. In the context of the present invention, an adhesive is understood preferably to have pressure-sensitive adhesiveness and hence to be a pressure-sensitive adhesive when at a temperature of 23° C. in the deformation frequency range from $10^0$ to $10^1$ rad/sec, G' and G" are each situated at least partly within the range from $10^3$ to $10^7$ Pa.

Irrespective of any pressure-sensitive adhesiveness, it is essential to the method of the invention that the adhesive tape comprises a curable adhesive. Through the facility for curing, the adhesive acts as a structural adhesive (cf. Rompp, Georg Thieme Verlag, document identifier RD-19-04489, last update: September 2012). According to DIN EN 923: 2006-01, structural adhesives are adhesives which form bonds which within a structure are able to retain a specified strength for a mandated, prolonged period of time (according to the ASTM definition: "bonding agents used for transferring required loads between adherends exposed to service environments typical for the structure involved").

They are therefore adhesives for bonds which can be highly loaded chemically and physically and which in the cured state contribute to the strengthening of the adhesive tapes.

In the method of the invention, the curable adhesive must be radiation-curing and/or thermally curing. In method step d), indeed, the curable adhesive is cured by the irradiation of the adhesive tape, or of the curable adhesive contained in the adhesive tape, with electromagnetic radiation of a wavelength $\lambda$. A radiation-curing adhesive here enables direct curing as a result of the exposure to electromagnetic radiation. The thermally curing adhesive in the method of the invention, conversely, is cured indirectly by the exposure to electromagnetic radiation, through the induction by the latter of an increase in temperature in the adhesive or surrounding parts of the adhesive tape, this temperature increase then leading to the curing. In this context it is possible in principle for the curable adhesive employed to be both directly radiation-curing and thermally curing as well.

Corresponding radiation-curing and/or thermally curing adhesives are likewise known to the skilled person from the prior art, as are the conditions employed for the curing in each case. Preferred curable adhesives, moreover, are disclosed below.

The strand wrapped with adhesive tape is brought into a predetermined shape. The predetermined shape may be dictated, for example, by a cable set plan. This shaping is accomplished in the method of the invention through the use of one or more holding elements which are part of a holding arrangement. In agreement with the understanding of the skilled person, the holding elements are the parts of the holding arrangement that are in contact with the wrapped strand. The wrapped strand which is arranged in these holding elements is brought into the desired shape through the arrangement of the holding elements in space. For the skilled person it is evident that method steps b) and c) here may optionally also be combined—for example, by arranging the strandlike element in the holding elements of the holding arrangement even before wrapping with the adhesive tape, and performing the wrapping in sections by lifting the strandlike element, for example, partly out of the holding elements. For certain regimes, therefore, preference is given to a method of the invention wherein the strandlike element is arranged at least partly in the holding arrangement during wrapping.

In method step d), the curable adhesive in the strand shaped as described above is then cured. This is causally accomplished in the method of the invention by the irradiation of the adhesive tape with electromagnetic radiation, with this electromagnetic radiation having a specific wavelength $\lambda$. For the skilled person it is clear that, for example, a chemical curing which takes place in daylight (which likewise constitutes electromagnetic radiation) is not curing in the sense of the method of the invention, since in this case the curing is not causally accomplished by the electromagnetic radiation.

In agreement with the understanding of a skilled person, the electromagnetic radiation used need not be monochromatic, i.e. need not possess only one wavelength in the spectrum. Instead, in practice, the radiation used will encompass a spectrum of different wavelengths. The skilled person selects the wavelength of the electromagnetic radiation as a function of the adhesive used, being able to find the necessary information in, for example, tabulated works or the manufacturer details for the materials employed, such as the photoinitiators, for example. With a view to an extremely time- and cost-efficient regime, it is advantageous for the great majority of cases relevant to practice if the electromagnetic radiation of wavelength $\lambda$ that is used for the curing, when employing electromagnetic radiation having a spectrum of wavelengths, is the wavelength having the greatest intensity in the radiation spectrum or at least has at least 50%, preferably at least 70%, more preferably at least 90% of the maximum intensity in the radiation spectrum.

The method of the invention uses a specific kind of holding elements. These holding elements, i.e. the parts of the holding arrangement that are in contact with the shaped strand, are at least in sections at least partly transmissive for electromagnetic radiation of the corresponding wavelength $\lambda$. Although it is preferable for all of the holding elements of the holding arrangement to be designed in this way, the skilled person appreciates that as well as the holding elements to be provided in accordance with the invention there may also be further holding elements provided that are designed in accordance with the prior art.

The expression "at least in sections" means that the holding elements need not be transmissive over the entire dimensions for electromagnetic radiation of the corresponding wavelength. The corresponding holding elements may in particular comprise thin regions which are not transmissive for electromagnetic radiation, in which case the curing takes place through a migrant reaction of the curing into these extremely narrow regions. Additionally or alternatively, however, there may also be specifically larger structures provided which serve for the deliberate shielding of subregions of the shaped strand by the holding elements, in order thus, for example, to establish a deliberate flexibility in the jacketing, of the kind achievable through an adhesive tape which in sections is not cured.

The expression "at least partly transmissive", in agreement with the understanding of the skilled person, means that a part of the electromagnetic radiation of wavelength $\lambda$ that is incident on the holding element may pass through the holding element, whether through an opening or through the use of a material which is at least partly transparent for the wavelength in question, the latter material being clearly preferred. In this case the skilled person understands that even materials which are largely transparent for electromagnetic radiation of the wavelength $\lambda$ frequently nevertheless exhibit little absorption for such radiation, and so strictly speaking are only partially transmissive for the electromagnetic radiation of corresponding wavelength. This is also explained in more detail below.

In order to ensure that the advantages of the method of the invention achieved through the use of the holding elements partially transmissive for the electromagnetic radiation are also manifested in the method of the invention, the definition is given that the irradiation of the adhesive tape in the shaped strand must actually take place through the holding elements designed correspondingly. Accordingly, in agreement with the understanding of the skilled person, the expression "at least partly" means that, for example, regions of the shaped strand also may be irradiated that are not arranged in a holding element but instead extend, for example, between two holding elements.

The corresponding jacketed strand in which the curable adhesive has been cured may be easily removed from the holding arrangement at the end of the method of the invention.

With the method of the invention, in a time- and cost-efficient way, strandlike elements with a high-performance jacketing are obtained, possessing excellent mechanical properties. By virtue of the holding elements designed to be transparent for the relevant radiation, it is advantageously possible to establish precisely the desired shape of the strandlike element, without too greatly hindering the curing of the curable adhesive through irradiation with electromagnetic radiation. As a result, even in the case of radiation-based curing, a large multiplicity of holding elements can be used, thereby enabling particularly precise strand routing, without curing defects because of unwanted masking of the shaped strand by the holding elements.

Through the use of corresponding holding elements it is possible advantageously to press the adhesive tape closely to the element to be jacketed, during shaping, and so to create a particularly dense assembly of jacketing and strandlike element. Moreover, because of the potentially high number of holding elements in the holding arrangement, it is possible for even untrained personnel to enable a reliable arrangement of the wrapped strand in the holding elements and therefore a precise shaping of the shaped strand, with even complex macrostructures being realizable here in an advantageous way.

In the estimation of the inventors, it is advantageous for certain applications if a thermally curable adhesive is employed. When such a thermally curable adhesive is employed, the curing in method step d) takes place such that the electromagnetic radiation of wavelength λ introduces energy into the adhesive tape or adhesive that leads to a temperature increase therein. Conducively, in the estimation of the inventors, electromagnetic radiation in the infrared range is used for this purpose, as may be provided, for example, by infrared lamps. This regime does not rule out the introduction of a different form of heat into the system as well, by contact heat or a separate heating facility, for example. Preference is therefore given to a method of the invention wherein the adhesive tape comprises as curable adhesive a thermally curable adhesive, where the thermally curable adhesive is preferably configured such that the thermal curing can be promoted and/or brought about, preferably brought about, by electromagnetic radiation in the infrared range, more preferably electromagnetic radiation having a wavelength in the range from 780 nm to 1 mm, especially preferably in the range from 780 nm to 50 µm, more particularly preferably in the range from 780 nm to 3 µm.

Thermally curable adhesives are known from the prior art, as for example from WO 2017109011 A1, from WO 2021018766 A1 or from EP 3693429 A1. In such thermally curable adhesives, as well as the thermally curable adhesive, in some cases a separate pressure-sensitive adhesive is provided as well, through which the pressure-sensitive adhesive properties are realized. Typical thermally curable adhesives may comprise, for example, epoxy resins and thermoplastic polymers in conjunction with a suitable curing agent and accelerator system. In order to ensure maximum curability through electromagnetic radiation, it may be useful here to add additives to the corresponding adhesives that boost the absorption properties in the corresponding wavelength range, in order to enable effective input of energy into the system. For example, thermally curable adhesives may be used which are curable thermally at a temperature in the range from 60 to 160° C., preferably in the range from 60 to 110° C., more preferably in the range from 60 to 100° C.

Particularly on account of the directness of the curing through application of electromagnetic radiation and the precise adjustability of the required wavelength by way of the initiator systems employed, the use of radiation-curing adhesives, preferably of predominantly radiation-curing adhesives, more preferably of substantially completely radiation-curing adhesives, is explicitly preferred for substantially all applications. Particular significance is accorded in this context to the UV-curable adhesives in particular, since they enable particularly powerful input of energy into the adhesive tape and efficient curing, and since a large multiplicity of suitable photoinitiators are available. Particularly preferred, therefore, is a method of the invention wherein the adhesive tape comprises as curable adhesive a radiation-curing adhesive, the radiation-curing adhesive preferably being a UV-curable adhesive, the UV-curable adhesive more preferably being curable by irradiation with electromagnetic radiation having a wavelength in the range from 10 to 380 nm, especially preferably in the range from 200 to 380 nm.

Radiation-curing adhesives are known from the prior art, as for example from EP3693433 A1 and the prior art acknowledged therein. One preferred radiation-curing adhesive comprises, for example, 15 to 50 parts by weight, preferably 20 to 40 parts by weight, of matrix polymer and 50 to 85 parts by weight, preferably 60 to 75 parts by weight, of epoxy resin and also 0.1 to 3 parts by weight of photoinitiator, optionally in conjunction with a photosensitizer, the matrix polymer forming a self-supporting film in which epoxy resin and photoinitiator are embedded.

The matrix polymer is preferably selected from the group consisting of styrene copolymers, acrylate copolymers, methacrylate copolymers, thermoplastic polyurethanes, copolyesters, copolyamides and ethylene-vinyl acetate copolymers, and mixtures of these polymers.

The epoxy resin(s) used for such adhesives may be a simple epoxy resin or a mixture of epoxy resins. In principle it is possible to use epoxy resins liquid at room temperature or epoxy resins solid at room temperature, or mixtures of these. Examples are 3,4-epoxycyclohexylmethyl 3',4'-epoxycyclohexanecarboxylate (EEC), dicyclopentadiene dioxide, 3-ethyl-3-oxetanemethanol, diglycidyl tetrahydrophthalate, diglycidyl hexahydrophthalate, ethane 1,2-diglycidyl ether, propane 1,3-diglycidyl ether, 1,4-butanediol diglycidyl ether, higher alkane 1,n-diglycidyl ethers, bis[(3,4-epoxycyclohexyl)methyl] adipate, vinyl cyclohexyl dioxide, 1,4-cyclohexanedimethanol bis(3,4-epoxycyclohexanecarboxylate), diglycidyl 4,5-epoxytetrahydrophthalate, bis[1-ethyl(3-oxetanyl)methyl] ether, pentaerythritol tetraglycidyl ether, and also the corresponding derivatives, and bisphenol A diglycidyl ether (DGEBA), hydrogenated bisphenol A diglycidyl ether, bisphenol F diglycidyl ether, hydrogenated bisphenol F diglycidyl ether, epoxyphenol novolacs, hydrogenated epoxyphenol novolac, epoxycresol novolacs, hydrogenated epoxycresol novolacs, 2-(7-oxabicyclo[4.1.0]hept-3-yl)spiro[1,3-dioxane-5,3'-[7]oxabicyclo[4.1.0]-heptane] and 1,4-bis((2,3-epoxypropoxy)methyl)cyclohexanes.

Photoinitiators which can be used for the cationic curing of the epoxy resins are, for example, sulfonium-, iodonium- and metallocene-based systems. Sulfonium-based cations are disclosed for example in U.S. Pat. No. 6,908,722 B1. Examples of suitable anions which may serve as counterions for the cations identified above are tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi(trifluoromethylsulfonyl)-amide and tris(trifluoromethylsulfonyl)methide. Also conceivable as anions, especially for iodonium-based initiators, are chloride, bromide or iodide, although preference is given to initiators which are substantially free of chlorine and bromine.

It is possible optionally to use photosensitizers, which reduce the photoinitiator in a redox process. In this process the actual photoinitiator is decomposed, with reactive cations being formed that are able to initiate a cationic polymerization. This type of reaction regime allows the cationic polymerization to be initiated at relatively high wavelengths. Examples of such photosensitizers are diphenolmethanone and derivatives, acetophenone derivates, anthracene derivates such as 2-ethyl-9,10-dimethoxyanthracene and 9-hydroxymethylanthracene, phenylketone derivates such as 1-hydroxycyclohexyl phenyl ketone, 2-hydroxy-2-methyl-1-phenylpropan-1-ones and 4-(2-hydroxyethoxy)phenyl(2-hydroxy-2-methylpropyl) ketone, and also thioxanthenone derivates such as 4-isopropyl-9-thioxanthenone or 1-chloro-4-propoxy-thioxanthenone.

With a view to the handling properties of the adhesive tape used, it is preferred if the adhesive tape comprises a carrier. In order to obtain mechanically robust jacketing, it is advantageous here if the carrier is formed from a porous material into which the curable adhesive is able to infiltrate at least partly, so that the curing process also leads to a stiffening of the carrier layer. Preference is given, accordingly, to a method of the invention wherein the adhesive tape comprises a preferably strandlike carrier, with the curable adhesive being arranged at least partly on the surface of the carrier.

The adhesive may be applied in the longitudinal direction of the adhesive tape in the form of a stripe which has a lower width than the first carrier.

Depending on the particular use, it is also possible for there to be multiple parallel stripes of the adhesive coated on the carrier. The position of the stripe on the carrier is freely selectable, with an arrangement directly at one of the edges of the carrier being preferred. The adhesive is preferably applied over the full area on the carrier.

Preference here is given to a method of the invention wherein the carrier comprises a porous carrier material, preferably a polyester nonwoven, where the curable adhesive is preferably arranged at least partly in the porous carrier material, preferably to an extent of more than 10%, more preferably more than 30%, especially preferably more than 50%, based on the mass of the curable adhesive.

The use of a carrier, which is advantageous from the standpoint of handling, may nevertheless be deleterious with a view to the radiation-based curing of the adhesive, specifically when the carrier shields the adhesive facing the strandlike element too greatly with respect to the electromagnetic radiation. This is the case especially when during wrapping, the adhesive tape is arranged overlappingly and so in subregions of the as yet uncured jacketing there are multiple plies of carrier material lying one above another. The inventors propose, accordingly, that the carrier material ought to be tailored to the electromagnetic radiation used or to the curing mechanism. Particularly when using radiation-curing adhesives, it is conducive if the carrier material is transmissive for the wavelength in question, since, for example, it has continuous cutouts and/or preferably is formed of a material which exhibits low absorption for the wavelength in question. When using thermally curable adhesives which are cured indirectly via the input of energy from the electromagnetic radiation into the adhesive tape and the associated increase in temperature, conversely, it has proven, as an alternative configuration, to configure the carrier material, by colouring, for example, such that it particularly largely absorbs the corresponding electromagnetic radiation and accordingly can be heated particularly easily by means of electromagnetic radiation. Preferred, consequently, is a method of the invention wherein the carrier at least in sections comprises a carrier material which is at least partly transmissive, preferably substantially completely transmissive, for electromagnetic radiation of wavelength $\lambda$, or wherein the carrier at least in sections comprises a carrier material which at least partly absorbs, preferably substantially completely absorbs, the electromagnetic radiation of wavelength $\lambda$, preferably electromagnetic radiation in the infrared range, in order to bring about and/or to promote radiation-based heating of the adhesive tape.

The basis weight of the carrier is preferably in the range from 30 to 300 $g/m^2$, preferably 50 to 200 $g/m^2$, more preferably 50 to 150 $g/m^2$, especially preferably 70 to 130 $g/m^2$. The coat weight of the curable adhesive applied on the carrier and/or introduced into the carrier is preferably in the range from 50 to 500 $g/m^2$, preferably 100 to 250 $g/m^2$, more preferably 100 to 200 $g/m^2$.

According to one particularly preferred embodiment of the invention, the adhesive tape comprises, preferably consists of, a carrier of which the full area bears the applied curable adhesive in the form of a radiation-curing and/or thermally curing adhesive, which at the same time is pressure-sensitively adhesive.

As elucidated above, the advantages of the method of the invention are manifested in a particularly pronounced way for those curable adhesives which exhibit low migrant reaction, i.e. wherein the curing brought about by irradiation at a defined point does not continue, or does not continue substantially, through the adhesive, since these adhesives, when conventional holding elements are used, have a particular tendency to form material defects which are attributable to incomplete curing. Generally speaking, however, such adhesives are particularly readily available and/or easy and cost-efficient to produce. Preferred against this background for certain applications, correspondingly, is a method of the invention wherein the curable adhesive exhibits a low migrant reaction, such that the curing brought about by irradiation with electromagnetic radiation of wavelength $\lambda$ at a point P at 23° C. extends within 24 h by less than 10 mm, preferably less than 5 mm, more preferably less than 1 mm into surrounding regions which have not been irradiated with electromagnetic radiation of wavelength $\lambda$.

In principle the holding elements can be attached in the holding arrangement in many different ways; in particular when using the method of the invention fora large number of strandlike elements of the same kind, a long-term joining may also be conducive. In the estimation of the inventors, however, it is preferable for the great majority of applications if the partly radiation-transmissive holding elements can be parted reversibly and non-destructively from the holding arrangement, being in that case joined to the holding arrangement via what are called carrier elements. For example, a configuration as holding elements that is preferred in this way may comprise a multiplicity of radiation-transmissive supports which are affixed at the ends of strutlike carrier elements and so form the receptacle for the wrapped strand. Preference is therefore given to a method of the invention wherein the one or the two or more holding elements are the receiving regions, intended for receiving the wrapped strand, of one or more carrier elements of the holding arrangement, the holding elements and/or the carrier elements being joined to the holding arrangement preferably reversibly and non-destructively partably.

The skilled person understands that with the method of the invention it is possible relative to the prior art to achieve advantages even when the holding elements at least in a part of the holding arrangement are at least partially transmissive, in each case at least in sections, for electromagnetic radiation of the specific wavelength. At the same time, however, in the light of the observations above, it is clear to the skilled person that the greater the electromagnetic radiation which is able to impinge on the adhesive tape in the shaped strand, the more efficiently the regime can take place. It is therefore particularly preferred if the holding elements are at least partly transmissive substantially over their overall dimensions, and additionally or alternatively it is particularly preferred for the transmissive parts of the holding elements to transmit electromagnetic radiation of the specific wavelength with particular efficiency. Preferred against this background is a method of the invention wherein the one or the two or more holding elements are at least partially transmissive over the entire length for electromagnetic radiation of wavelength $\lambda$, and/or wherein the one or the two or more holding elements are transmissive for electromagnetic radiation of wavelength $\lambda$, at least in sections to an extent of 30% or more, preferably 50% or more, more preferably 70% or more, more preferably 90% or more, especially preferably 95% or more, based on the ratio of the total intensity of the electromagnetic radiation of wavelength $\lambda$ irradiated onto the holding element to the total intensity of the electromagnetic radiation of wavelength $\lambda$ passing through the holding element.

A configuration of the holding elements that is suitable for the method of the invention may be achieved in principle by providing the holding elements with continuous cutouts, as is the case, for example, in a lattice or a strut structure, so that irradiation can take place through the lattice openings or through the free spaces between the struts. Such holding elements are generally particularly easy to manufacture and very flexible in particular in terms of the selection of material. In particular, holding elements of this kind which are not dependent on transparency of the materials used may be configured with particular durability through the use of metals. Moreover, such holding elements may be provided with a usually non-transparent non-stick coating, with polytetrafluoroethylene (PTFE), for example, allowing the cured strand to be easily removed subsequently from the holding elements in particular even when using carrierless adhesive tapes. Preferred accordingly is a method of the invention wherein the one or the two or more holding elements at least in sections, preferably substantially over the entire length of the holding elements, have a lattice structure and/or have a multiplicity of perpendicular struts, wherein the irradiation with the electromagnetic radiation takes place at least partly through cutouts present in the lattice structure and/or between the struts, with the lattice structure and/or the struts preferably having a mean thickness of less than 10 mm, preferably less than 5 mm, more preferably less than 2 mm, and where the one or the two or more holding elements may be produced preferably by 3D printing, milling or by deep-drawing of expanded metal sheets, and more preferably may be produced by 3D printing.

Relative to the embodiment described above, however, it is especially preferable in the estimation of the inventors if the transmissiveness of the holding element is not generated, or not generated exclusively, by a structuring, but if instead a suitable selection of material is made that produces the transmissiveness for corresponding electromagnetic radiation of wavelength $\lambda$. A corresponding configuration makes it possible to surround the shaped strand extensively with the holding elements while shielding it in sections from the environment, without adversely affecting the curing by means of irradiation. Preference is given to a method of the invention wherein the one or the two or more holding elements are formed at least in sections, preferably to an extent of 50% or more, more preferably 70% or more, especially preferably 90% or more, more particularly preferably substantially completely, of a material which is at least partly transmissive for electromagnetic radiation of wavelength $\lambda$, the material preferably having an absorption coefficient $\alpha$ for electromagnetic radiation of wavelength $\lambda$ of 1.0 1/cm or less, preferably of 0.7 1/cm or less, more preferably of 0.4 1/cm or less, especially preferably of 0.2 1/cm or less.

Suitable materials can be identified freely by the skilled person here, depending on the wavelength employed, the skilled person being able for example to employ tabulated absorption coefficients. Illustrative materials may be indicated using the example of UV-curable pressure-sensitive adhesives which are cured by exposure to electromagnetic radiation with a wavelength $\lambda$ in the ultraviolet range. Preferred in this case, indeed, is a method of the invention wherein the one or the two or more holding elements are formed at least in sections, preferably to an extent of 50% or more, more preferably 70% of more, especially preferably 90% or more, more particularly preferably substantially completely, of a material which is selected from the group consisting of polymethyl methacrylate, amorphous polyethylene terephthalate and glycol-modified polyethylene terephthalate, where the one or the two or more holding elements are producible preferably by forming processes, more preferably thermoforming.

Especially when using materials transmissive for electromagnetic radiation of wavelength $\lambda$, the inventors propose that the holding elements may have a receptacle which is adapted to the cross section of the planned jacketed strand, in order to be able to stabilize, with particular efficiency, the cross-sectional shape of the jacketed strand to be produced, during the curing process, and moreover, to enable close packing of the strand in the holding elements, so that the adhesive tape used conforms particularly tightly to the strandlike element that is to be jacketed. Although it is possible here to provide rectangular cross sections, for example, by means of a holding element with U-shaped profile, for example, it is generally conducive, with a view to the generally approximately circular cross sections of customary cable looms and the volume-optimized arrangement of the cables that is possible accordingly, to provide receptacles in the form of a partial circle, i.e. a rounded receptacle. In this context in particular a semicircular cross section of the receptacles is a good compromise between easy introduction of the wrapped strand into the holding element and the best-possible stabilization. Particularly favourable in this context, according to the estimation of the inventors, are holding elements which take the form of half-tubes, i.e. elongate receptacles having a cross section consistently in the form of a partial circle, where corresponding holding elements may be obtained easily for example by breaking down tubular intermediates. Preferred accordingly is a method of the invention wherein the one or the two or more holding elements at least in sections, preferably over the entire length of the holding elements, have a receptacle with a cross section in the form of a partial circle, preferably a substantially semicircular cross section. Particularly preferred, accordingly, is a method of the invention wherein the one or the two or more holding elements are formed at least in sections, preferably over the entire length of the holding elements, as half-tubes. Especially when the holding elements are manufactured by means of deep drawing, the production of relatively complex structures is also possible in an efficient way, and so for certain applications the use of holding elements which have different cross-sectional areas in different sections of the holding element is preferred.

Because of the excellent stabilization which can be implemented with the corresponding holding elements, without having too great an adverse effect on the radiation-based curing, it is preferred, with a view to the production of particularly precisely configured jacketed strands, to stabilize the major part of the wrapped strand, or of the part of the shaped strand that is to be cured, in corresponding holding elements. Preferred is a method of the invention wherein the wrapped strand is arranged in the holding elements such that more than 30%, preferably more than 50%, more preferably more than 70%, especially preferably more than 90%, more particularly preferably more than 95%, of the wrapped strand is arranged in the one or the two or more holding elements, based on the length of the wrapped strand or on the length of that part of the shaped strand that is irradiated with electromagnetic radiation, preferably based on the length of that part of the shaped strand that is irradiated with electromagnetic radiation.

As a particularly relevant onward development of the above-described regime, the inventors regard the possibility of providing covering elements which are complementary to the holding elements and which, analogously to the holding elements, are likewise transmissive for electromagnetic radiation. Following the arrangement of the wrapped strand in the holding elements, such covering elements can be placed onto these holding elements in order to cover the strand thus shaped and so to shield it for example from unwanted environmental influences, such as moisture or particles of dirt, for example. Additionally or alternatively, the covering element also serves for additional fastening of the strand to be cured, hence enabling an assurance of particularly precise strand routing and close packing of the strandlike elements in the jacketed strand. Corresponding systems composed of holding element and covering element may be manufactured particularly easily here from tubular intermediates, which for this purpose can be cut open centrally along the longitudinal direction, for example. Preferred is a method of the invention wherein the wrapped strand, after being arranged in the holding elements, is covered, preferably covered and secured, at least in sections, preferably completely, by one or more covering elements, the one or the two or more covering elements at least in sections being at least partly transmissive for electromagnetic radiation of wavelength $\lambda$, the irradiation of the adhesive tape with the electromagnetic radiation of wavelength $\lambda$ taking place at least partly through the one or the two or more covering elements, where the one or the two or more covering elements are preferably complementary to the holding elements, and where the one or the two or more covering elements with particular preference are implemented as half-tubes complementary to the holding elements.

As elucidated above, the skilled person selects the curing wavelength used as a function of the curable adhesive employed, and tailors it to the holding elements used. In principle, however, the inventors have succeeded in identifying wavelength ranges, suitable for the preferred curable adhesives, that lie in particular in the infrared and ultraviolet ranges. Preferred accordingly is a method of the invention wherein the curable adhesive is cured with electromagnetic radiation of wavelength $\lambda$ in the range from 10 to 380 nm, preferably in the range from 200 to 380 nm, and/or wherein the curable adhesive is cured with electromagnetic radiation having a wavelength $\lambda$ in the range from 780 nm to 1 mm, preferably in the range from 780 nm to 50 µm, more preferably in the range from 780 nm to 3 µm, and/or wherein the curable adhesive is cured with electromagnetic radiation whose intensity maximum lies at the wavelength $\lambda$.

For the electromagnetic radiation used for curing it has proved to be preferable, with a view to the energy applied per unit area, to establish an energy flow density in the range from 8 to 14 J/cm², preferably 9 to 12 J/cm².

The curing in method step d) is accomplished usefully by means of a suitable radiation device whose emission spectrum is tailored to the wavelength $\lambda$ used for the curing. As a particularly advantageous configuration it is proposed that the radiation device surrounds the shaped strand at least in sections. This is possible, for example, with a shielded box, with the box preferably having reflective faces on its inside; advantageously, the personnel deployed are protected against electromagnetic radiation. Alternatively the curing may also be achieved by the use of portable apparatuses comprising, for example, an at least partly annular illumination device, with which the shaped strand is surrounded form-fittingly, so to speak, and can therefore be cured simultaneously from multiple sides. Preferred against this background is a method of the invention wherein the curable adhesive is cured with a radiation device, preferably a UV lamp and/or an IR lamp, more preferably a UV lamp, the radiation device being preferably configured to surround the shaped strand at least partly, preferably substantially form-fittingly, and to irradiate the shaped strand with electromagnetic radiation of wavelength $\lambda$ at least in sections over 70% or more, preferably 80% or more, more preferably 90% or more, especially preferably 95% or more, of the extent, the radiation device comprising, with more particular preference, a light chamber having reflective faces.

For the skilled person it is self-evident that in order to obtain highly mechanically robust jacketing, it is conducive to design the regime such that the curable adhesive is cured sufficiently, this being possible to the skilled person through the establishment as desired of the irradiation time and the curing conditions. Inherently preferred, therefore, is a method of the invention wherein the curable adhesive is cured in method step d) to an extent of more than 50%, preferably more than 70%, more preferably more than 90%, especially preferably more than 95%.

As part of the development of the present invention, the inventors recognized that in spite of the substantially radiation-based curing through the holding elements that are to be used, it is nevertheless advantageous to provide for active temperature management. In particular, excellent mechanical durabilities of the jacketing produced are achieved if there is preheating before the irradiation of the shaped strand. The implementation of the holding elements in accordance with the invention makes it possible here in an advantageous way to provide, for example, thin heating wires enabling the energy-efficient pre-conditioning of the shaped strand over large sections, without reducing the radiation-based curing to too great an extent. In a similar way it is also favourable to establish an increased temperature during the irradiation. Particularly high-performing jacketing is achieved, ultimately, when after the radiation-based curing, an aftercuring at an elevated temperature is also provided. Preferred is a method of the invention wherein the curing in method step d) before the irradiation comprises a preheating of the shaped strand at a temperature $T_1$ in the range from 20 to 60° C., preferably in the range from 30 to 50° C., and/or wherein the curing in method step d) takes place by irradiation at a temperature $T_2$ in the range from 20 to 90° C., preferably in the range from 30 to 80° C., more preferably in the range from 40 to 70° C., and/or wherein the curing in method step d) after the irradiation comprises an aftercuring at a temperature $T_3$ in the range from 60 to 150° C., preferably in the range from 70 to 140° C., more preferably in the range from 80 to 130° C. It is particularly preferred here if in the method of the invention all of the temperatures $T_1$, $T_2$ and $T_3$ are established correspondingly.

The skilled person understands that the jacketed strand producible with the method of the invention is also advantageous per se, as it possesses a high-performance jacketing which advantageously is free from material defects caused by a locally inadequate radiation-based curing. Also disclosed in connection with the invention, therefore, is a jacketed strand, more particularly a cable loom, produced or producible with the method of the invention for jacketing strandlike elements.

A particularly great advantage of the invention is that through corresponding devices the adhesive can be irradiated very effectively over the entire extent, since the adhesive tape, whether with or without carrier, externally jackets the cables, and so the adhesive to be cured cannot be shadowed by the cables.

For the skilled person it is clear, moreover, that a corresponding holding arrangement as is used in the method of the invention is inherently likewise advantageous, by virtue of its enabling the implementation of the method of the invention, with preferred holding arrangements being implemented such that they can be used to carry out preferred methods of the invention. The invention correspondingly also relates to a holding arrangement for establishing a predetermined shape of a shaped strand in a method of the invention, comprising one or more holding elements for receiving the wrapped strand, the one or the two or more holding elements at least in sections being at least partly transmissive for electromagnetic radiation of wavelength $\lambda$.

A further advantage is that the strand may also be shaped such that it projects from a two-dimensional plane and takes on a three-dimensional form, something which may be of increased interest particularly in the case of branched-off portions.

Preferred in this context is a holding arrangement according to the invention wherein the one or the two or more holding elements are part of one or more carrier elements of the holding arrangement, the holding elements and/or carrier elements being joined preferably reversibly and non-destructively partably to the holding arrangement.

The invention, lastly, also relates to a system for implementing the method of the invention, comprising a holding arrangement of the invention, and a radiation device, preferably a UV lamp and/or an IR lamp, more preferably a UV lamp, the radiation device being preferably configured to surround a shaped strand at least partly, and to irradiate the shaped strand with electromagnetic radiation of wavelength $\lambda$ at least in sections over 70% or more, preferably 80% or more, more preferably 90% or more, especially preferably 95% or more, of the extent.

Preferred accordingly is a system of the invention further comprising a conditioning unit for establishing the temperature of the shaped strand arranged in the radiation device, before and/or during and/or after the irradiation.

Described and elucidated in more detail below are preferred embodiments of the invention with reference to the appended figures, in which.

Figure 1:
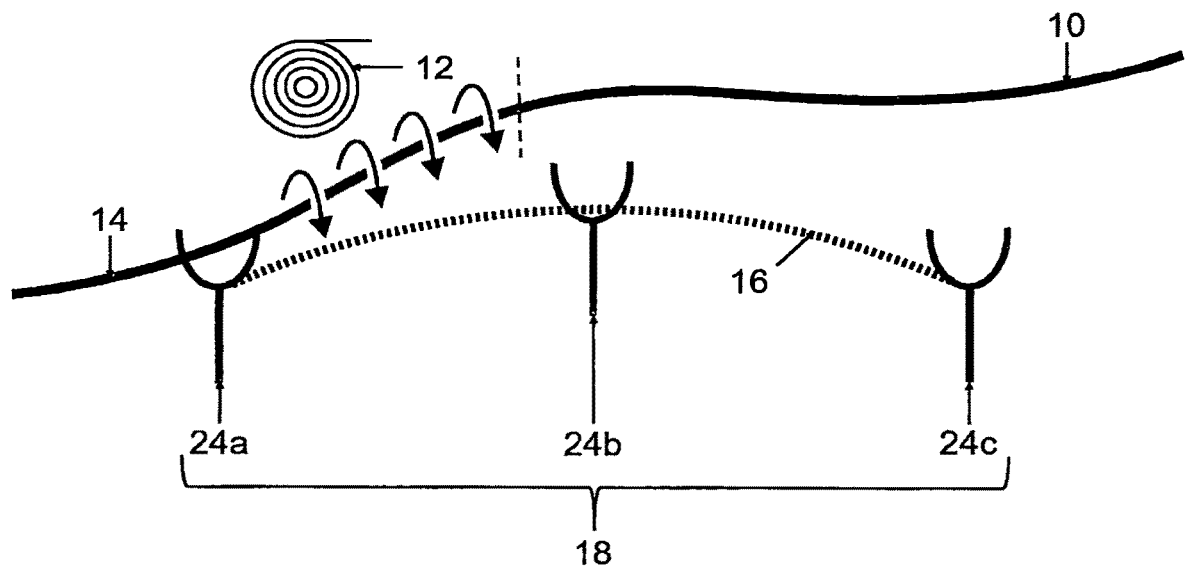
FIG. 1 shows a schematic representation of the method of the invention at a first point in time in one preferred embodiment.

FIG. 1 shows a schematic representation of the method of the invention at a first point in time. The strandlike element 10 provided for the jacketing in the example shown is a cable strand which comprises a multiplicity of cables joined to one another by the use of adhesive tape in order to facilitate handling of the strandlike element 10; accordingly, it would also be possible, additionally or alternatively, to use cable ties and clips. This strandlike element 10 is part of a macrostructure, specifically a complete cable loom as envisaged for a motor vehicle; in FIG. 1, for reasons of clarity, only a portion has been shown.

It is indicated in FIG. 1 that the strandlike element 10 is wrapped with an adhesive tape 12, to obtain a wrapped strand 14 in the wrapped region. In the example shown, this wrapping takes place in helical lines around the strandlike element 10, with each subsequent turn lying about half on the preceding turn. The strandlike element 10 shown in FIG. 1 is already wrapped here to about half with adhesive tape 12, this being indicated by the dashed line.

The adhesive tape 12 comprises a curable adhesive, which for improved application is implemented as a pressure-sensitive adhesive. In the example shown, this curable adhesive is radiation-curing. More particularly the curable adhesive is curable by irradiation with electromagnetic radiation of wavelength A in the ultraviolet range, more particularly in the range from 200 to 380 nm. In the example shown, the adhesive tape 12 comprises a porous nonwoven in which the curable adhesive is embedded in a mass fraction of about more than 50%. The nonwoven in this case is formed of a plastic which is partly transmissive for electromagnetic radiation of wavelength $\lambda$ in the ultraviolet range. The curable adhesive is based on the systems disclosed in EP 3693433 A1 and comprises, for example, as well as photoinitiator (mass fraction 1%), an epoxy resin (mass fraction 65%) and a matrix polymer (mass fraction 34%).

In the example shown, the holding arrangement 18 comprises three carrier elements 24a, 24b and 24c of equal length, each with a fork-shaped holder at the end, and the middle carrier element 24b is offset backwards, so that the carrier elements 24a-24c span a triangle. Inserted into the fork of the carrier elements 24a-24c in FIG. 1 is a holding element 16, which through a form-fit is joined reversibly and non-destructively partably to the carrier elements 24a-24c. This holding element 16, indicated by the dashed line, is implemented in this case as a bent half-tube having a semicircular cross section which is formed completely of polymethyl methacrylate, which at the selected thickness for the tube side wall has a transmissiveness of more than 95% for electromagnetic radiation of the wavelength $\lambda$ used in the UV range, and so the intensity of the electromagnetic radiation of the corresponding wavelength that impinges through the holding element 16 onto the wrapped or shaped strand 20 is reduced by less than 5% during irradiation.

Figure 2:
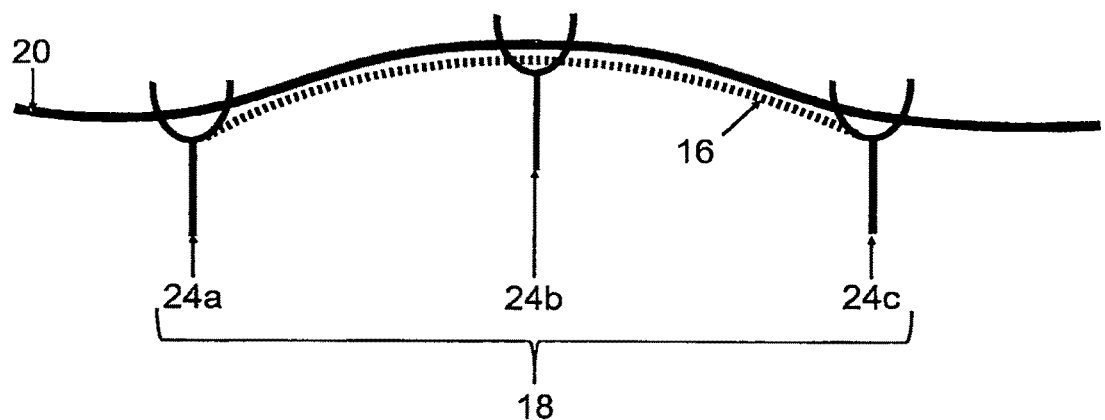
FIG. 2 shows a schematic representation of the method of the invention at a second point in time in one preferred embodiment.

Shown in FIG. 2 then, on the basis of FIG. 1, is how the wrapped strand 14 is arranged in the holding element 16, this being accomplished by insertion of the wrapped strand 14 into the tubular receptacle of the holding element 16, with the wrapped strand 14 adopting the shape dictated by the holding element 16 and thereby becoming the shaped strand 20, which, based on the length of that part of the shaped strand 20 that is subsequently cured with electromagnetic radiation, lies in the holding element 16 to an extent of more than 80%.

Figure 3:
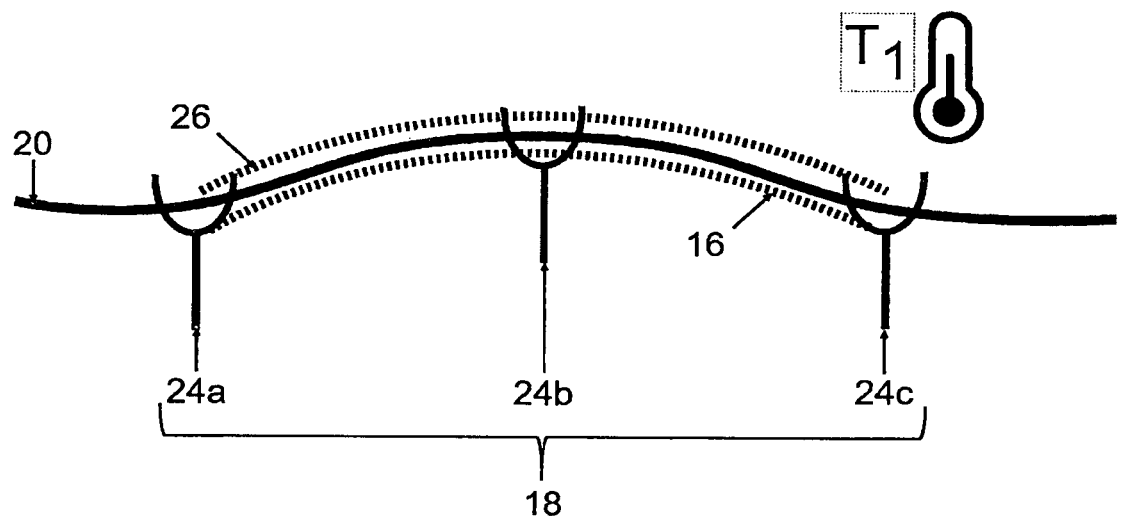
FIG. 3 shows a schematic representation of the method of the invention at a third point in time in one preferred embodiment.

FIG. 3 then shows how the shaped strand 20 in the holding element 16 is additionally covered, over the entire length of the holding element 16, with a covering element 26 that is complementary to said holding element 16 and that is likewise formed as a half-tube of polymethyl methacrylate. This covering element 26 covers and fastens the shaped strand 20. In this case it is indicated in FIG. 3 that the shaped strand 20 in the radiation device 28 is preheated prior to curing to a temperature of about 40° C. in order to realize a preferred regime.

Figure 4:
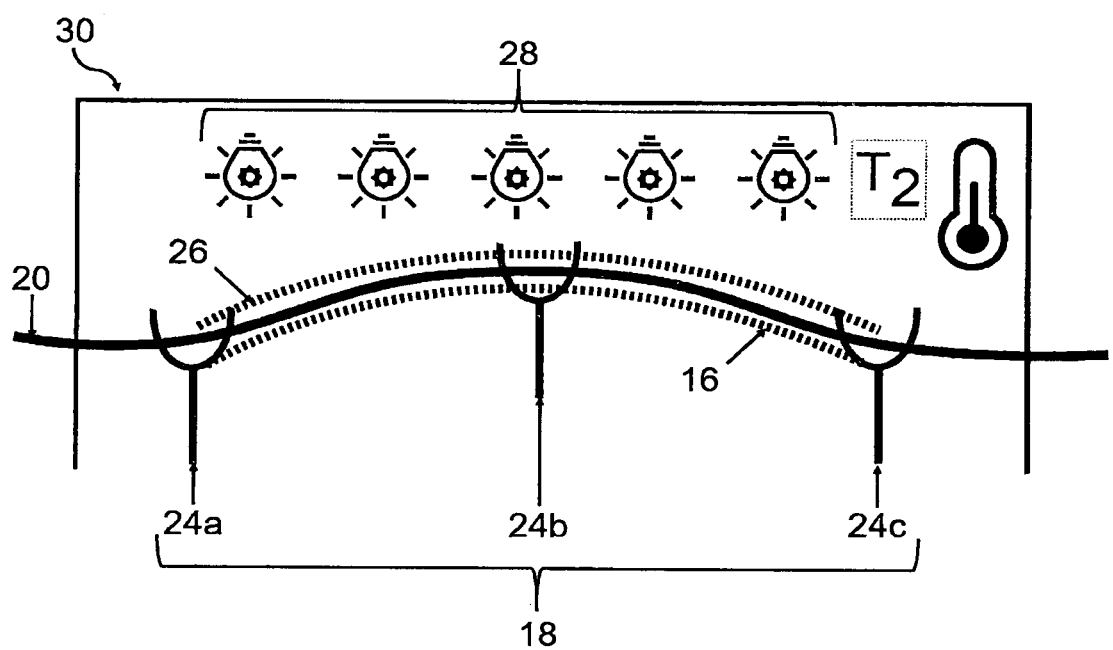
FIG. 4 shows a schematic representation of the method of the invention at a fourth point in time in one preferred embodiment.

As shown in FIG. 4, the shaped strand 20 prepared according to FIG. 3 is subsequently cured by irradiation of the adhesive tape 12 in the shaped strand 20 with electromagnetic radiation of a wavelength in the ultraviolet range. This takes place in a system 30 of the invention, which comprises a radiation device 28, presently implemented as a radiation box, in which the UV lamps arranged are shielded from the outside world by the surrounding box. In this case, for the curing by means of irradiation, a temperature of about 50° C. is established inside the radiation device. As evident in FIG. 4, the electromagnetic radiation of wavelength $\lambda$ in the ultraviolet range is applied through the holding element 16 and through the covering element 26, which by virtue of the material selected are each largely transmissive for electromagnetic radiation of the corresponding wavelength essentially over the entire length and the entire extent.

Figure 5:
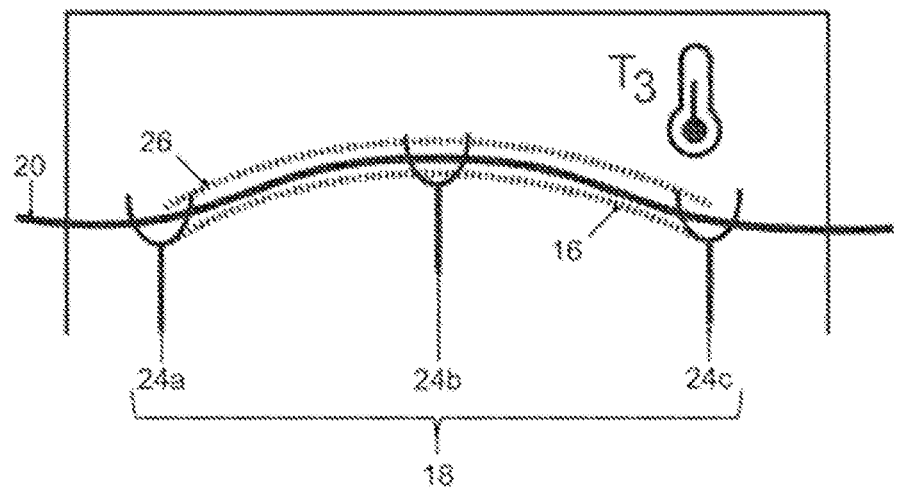
FIG. 5 shows a schematic representation of the method of the invention at a fifth point in time in one preferred embodiment.
Figure 6:
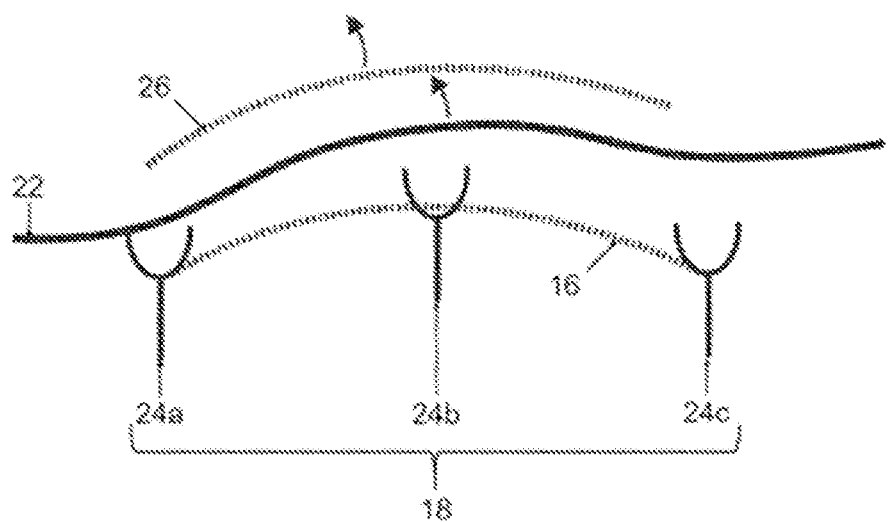
FIG. 6 shows a schematic representation of the method of the invention at a sixth point in time in one preferred embodiment.

In FIG. 5, the UV lamps of the radiation device 28 are deactivated and an aftercure takes place at a temperature of about 100° C. Lastly it can be seen in FIG. 6 how the covering element 26 is removed, allowing the withdrawal of the jacketed strand 22, i.e. the strandlike element 10 surrounded by the cured adhesive tape 12 and having the predetermined shape.

LIST OF REFERENCE SYMBOLS

10 Strandlike element
12 Adhesive tape
14 Wrapped strand
16 Holding element
18 Holding arrangement
20 Shaped strand
22 Jacketed strand
24a-c Carrier elements
26 Covering element
28 Radiation device
30 System

The invention claimed is:

1. A method of jacketing strandlike elements, comprising the method steps of:
   a) producing or providing a strandlike element,
   b) wrapping the strandlike element with an adhesive tape to give a wrapped strand, the adhesive tape comprising as curable adhesive a radiation-curing and/or a thermally curing adhesive which may also be a pressure-sensitive adhesive,
   c) arranging the wrapped strand in one or more holding elements of a holding arrangement to establish a predetermined shape and to give a shaped strand, and wherein the wrapped strand is covered, and may also be secured, at least in sections or completely, by one or more covering elements, the one or more covering elements at least in sections being at least partly transmissive for electromagnetic radiation of wavelength $\lambda$, the irradiation of adhesive tape with the electromagnetic radiation of wavelength $\lambda$ taking place at least partly through the one or more covering elements, and,
   d) curing the curable adhesive in the shaped strand by irradiating the adhesive tape with electromagnetic radiation of a wavelength $\lambda$, to give a jacketed strand, wherein the one or more holding elements at least in sections are at least partly transmissive for electromagnetic radiation of wavelength $\lambda$,
   wherein the irradiation of the adhesive tape with the electromagnetic radiation of wavelength $\lambda$ takes place at least partly through the one or more holding elements.

2. The method of claim 1, wherein the adhesive tape comprises as the curable adhesive the radiation-curing adhesive, wherein the radiation-curing adhesive is a UV-curable adhesive, curable by irradiation with electromagnetic radiation having a wavelength in the range from 10 to 380 nm.

3. The method of claim 2, wherein the UV-curable adhesive, curable by irradiation with electromagnetic radiation having a wavelength in the range from 200 nm to 380 nm.

4. The method of claim 1, wherein the adhesive tape comprises a carrier, the curable adhesive being arranged at least partly on the surface of the carrier.

5. The method of claim 4, wherein the carrier at least in sections comprises a carrier material which is at least partly, transmissive for electromagnetic radiation of wavelength $\lambda$.

6. The method of claim 1, wherein the adhesive tape comprises a carrier and the curable adhesive coated on the carrier and in the form of the radiation-curing and/or thermally curing adhesive which is applied over the full area and which at the same time is pressure-sensitively adhesive.

7. The method of claim 1, wherein the two or more holding elements are receiving regions, provided for receiving the wrapped strand, the holding arrangement further comprises one or more carrier elements, wherein the one or more holding elements and/or the carrier elements being connected reversibly and non-destructively partably to the holding arrangement.

8. The method of claim 1, wherein the one or more holding elements over the entire length are at least partly transmissive for electromagnetic radiation of wavelength $\lambda$.

9. The method of claim 1, wherein the one or more holding elements at least in sections are transmissive to an extent of 30% or more, for electromagnetic radiation of wavelength $\lambda$, based on the ratio of the total intensity of the electromagnetic radiation of wavelength $\lambda$ irradiated onto the one or more holding elements to the total intensity of the electromagnetic radiation of wavelength $\lambda$ passing through the one or more holding elements.

10. The method of claim 1, wherein the one or more holding elements are formed at least in sections, of a material which is at least partly transmissive for electromagnetic radiation of wavelength $\lambda$.

11. The method of claim 10, wherein the material has an absorption coefficient a for electromagnetic radiation of wavelength λ of 1.0 1/cm or less.

12. The method of claim 11, wherein the material has an absorption coefficient a for electromagnetic radiation of wavelength λ of 0.7 1/cm or less.

13. The method of claim 1, wherein the wrapped strand is arranged in the one or more holding elements such that more than 30%, of the wrapped strand is arranged in the one or the OF more holding elements, based on the length of the wrapped strand or on the length of that part of the shaped strand that is irradiated with electromagnetic radiation.

14. The method of claim 1, wherein the curable adhesive is cured with a radiation device, the radiation device being configured to surround the shaped strand at least partly, and to irradiate the shaped strand with electromagnetic radiation of wavelength λ at least in sections over 70% or more, of its extent.

15. The method of claim 14, wherein the radiation device is a UV lamp and/or an IR lamp.

16. The method of claim 1, wherein the curing in method step d) before the irradiation comprises a preheating of the shaped strand at a temperature $T_1$ in the range from 20 to 60° C., and/or wherein the curing in method step d) takes place by irradiation at a temperature $T_2$ in the range from 20 to 90° C., and/or wherein the curing in method step d) after the irradiation comprises an after curing at a temperature $T_3$ in the range from 60 to 150° C.

17. A holding arrangement which establishes a predetermined shape of a shaped strand in a method according to claim 1, comprising one or more holding elements for receiving the wrapped strand, wherein the one or more holding elements are receiving regions, provided for receiving the wrapped strand, at least in sections are at least partly transmissive for electromagnetic radiation of wavelength λ, wherein the one or more holding elements are part of one or more carrier elements of the holding arrangement, the one or more holding elements and/or carrier elements being connected reversibly and non-destructively partably to the holding arrangement.

18. A system implementing the method according to claim 1, comprising a holding arrangement which establishes a predetermined shape of a shape strand of the method, the holding arrangement comprising one or more holding elements which are receiving regions for receiving the wrapped strand, wherein the one or more holding elements at least in sections are at least partly transmissive for electromagnetic radiation of wavelength λ, wherein the one or more holding elements are part of one or more carrier elements of the holding arrangement, the one or more holding elements and/or carrier elements being connected reversibly and non-destructively partably to the holding arrangement, and a radiation device being configured to at least partly surround the shaped strand and to irradiate the shaped strand with electromagnetic radiation of wavelength λ at least in sections over 70% or more of its extent.

* * * * *